United States Patent Office.

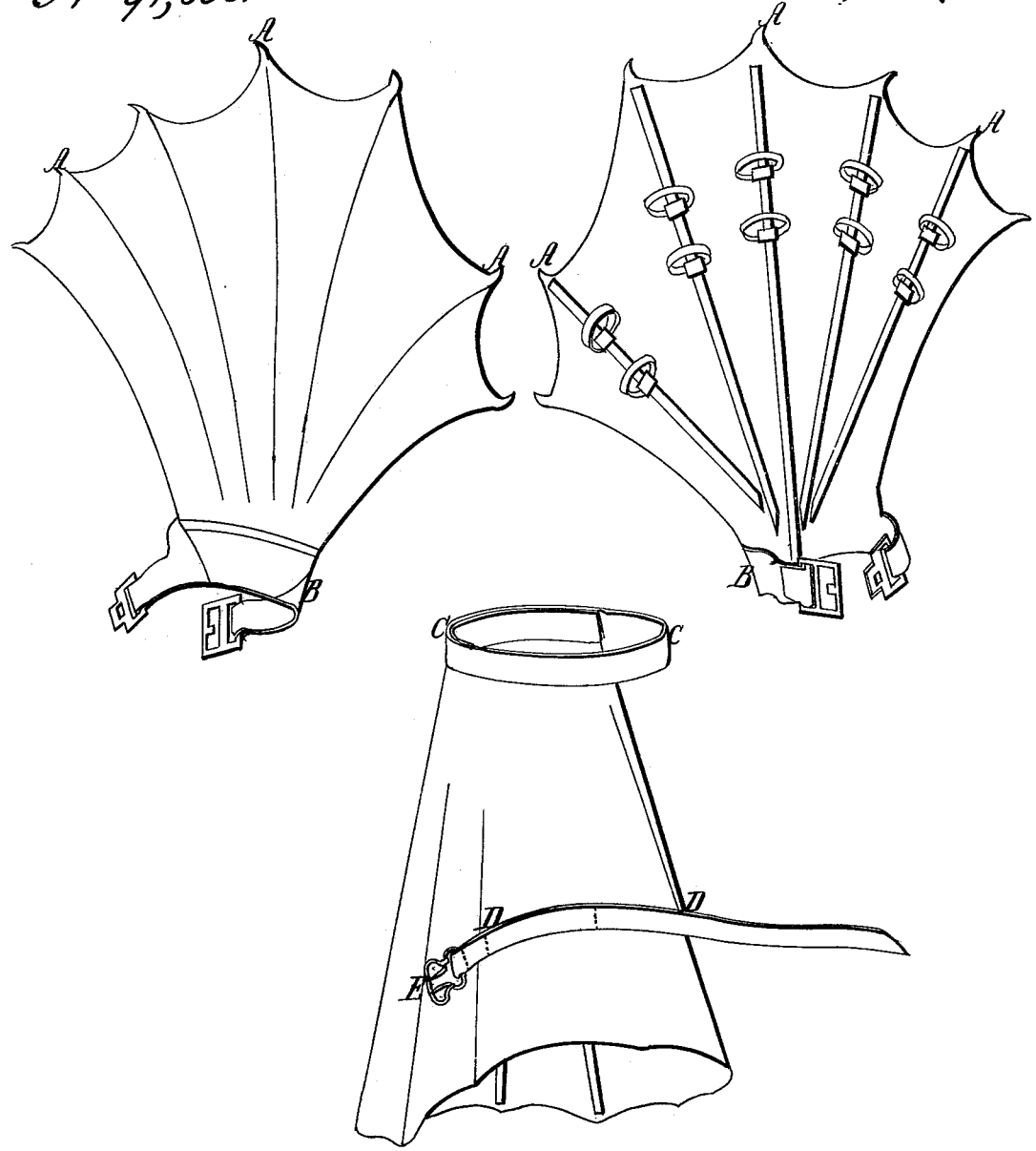

FREDERIC BARNETT, OF PARIS, FRANCE.

Letters Patent No. 91,300, dated June 15, 1869.

SWIMMING-APPARATUS.

The Schedule referred to in these Letters Patent and making part of the same.

Specification for an Improved Swimming-Apparatus.

I, FREDERIC BARNETT, of 164 rue Rivoli, Paris, in the Empire of France, do hereby declare the nature of the said invention for an improved system of swimming-apparatus.

The organization of man in no way indicates that nature fitted him to imitate the capabilities of aquatic birds, or, in a word, to possess the faculty of floating and steering himself upon the waters. Still, in spite of this inaptability, and the opposing and unstable nature of the element, many become comparatively expert swimmers; but this achievement is attributable to the vast human intelligence, seconded by a long and arduous apprenticeship; and even then the great majority venture with fear and trembling beyond their depths, for the exertion of the muscular-powers sustains them on the surface for but a very limited period, and the powers of locomotion are so soon exhausted that few dare venture beyond assistance, or otherwise content themselves to remain in such depths of water where they can readily touch the ground.

The object of my invention is to remedy this defect, and that without impinging on or altering the present received system of swimming, so that he who can swim, though he be used to my apparatus, should, when without them, still be able to sustain himself on the water, as heretofore; but by the adoption of my apparatus a man will be able to sustain himself with infinitely more ease, and propel himself with great facility and celerity, long distances; and I herewith describe the nature and application of my invention.

To this end, I make certain apparatus, answering all the purposes of fins, and which I call human fins, the same having the properties, and also capable of performing the functions of the feet of aquatic birds.

To attain this end, I supply the hands with extensive membranes, which are both firm and supple, being composed of India rubber, or of any other material that will answer the same purpose.

This membrane, A A A, is both wider and longer than the hand, depassing it in every way about two inches.

To this membrane I give the necessary rigidity by the insertion of small elongated bodies of whalebone, cane, or any other suitable substance, which, springing from the lower part or wrist at B, extend laterally with the fingers, to the full extent of the membrane.

These membranes or fins I apply, by preference, to the outside of the hands, to permit, when desirable, the fingers to clutch at any object when in the water. They are firmly attached to the fingers by loops, and to the wrists by buckles or elastic bands.

The supple nature of the membranes, connecting the fingers and thumbs in one almost unbroken surface, will permit the closing of the fingers and thumbs against each other, as is the usual practice of swimmers; but when extended, the immense sustaining-surface will enable the swimmer to support himself with the greatest facility, besides obtaining an increased power of locomotion when the fins are used for paddling.

I also apply to the outside of the legs, between the ankle and the calf, what I call propelling-fins, C C, D D.

These fins are constructed of the same materials as the hand or sustaining-fins, and are also provided with strengthening-nerves, of whalebone or other suitable material.

In form and construction, they resemble the half of an umbrella or parachute, having, in some measure, the shape of a truncated cone, C C, D D, of which the smaller end is hermetically attached near the calf of the leg, while the larger end opens toward the foot.

These sides of this umbrella-shaped cone are firmly attached to bands, at C D, C D, which bands are attached to the leg by buckles or otherwise, as at E E, or by elastic bands or belts, passed over the foot, and then clinging, by their contracting nature, round the larger and smaller part of the leg.

It will be apparent, by the form and disposition of this leg-fin, that it is perfectly self-acting, because, when the leg is used as a propeller, and drawn toward the body of the swimmer, the small and closed end of the umbrella-cone will offer no resistance to the water, and the whole being supple, will collapse against the leg; but immediately that the leg be extended from the body, acting as a propeller, the umbrella-shaped cone will open to its full extent, acting like a parachute when opposed to the air, and will, by such means, present a large surface opposing the water. Its peculiar form, and the sustaining-ribs of whalebone or other suitable material, will effectually prevent it from yielding, and thus the whole distended inner surface will act as an opposing body to the water, enabling the swimmer to propel himself rapidly with comparative ease, to long distances, for long periods, with little fatigue.

By my above description, I fully exhibit and declare the nature of my invention. At the same time, be it understood, that I reserve the full right to change and modify the composition, material, application, dimension, and form of my swimming-apparatus or human fins, and the right to apply them to any other part of the body, or the principle to any bodies, living or inert.

I should add, that by the use of my fins the swimmer will be much less liable to suffer from cramp while in the water, because the muscles, when extended, will be exerted against a sufficient resistance.

Having thus described my invention,

What I claim as new therein, and desire to secure by Letters Patent, is—

1. The combination of the webbing, the distending-strips, the finger-loops, and the wristband for the hands, substantially as described.

2. The distensible sack, the strips, and the ankle-strap, combined substantially as described, for supporting the feet.

October 11, 1868.

FREDERIC BARNETT,
164 *Rue de Rivoli, Paris,*
*In the Empire of France.*

Witnesses:
F. OLCOTT,
J. U. ZUST.